United States Patent

Müller

Patent Number: 5,881,635
Date of Patent: Mar. 16, 1999

[54] ENAMELLED COOKWARE AND METHOD OF MANUFACTURING IT

[75] Inventor: Frank Müller, Ahlen, Germany

[73] Assignee: Merten & Storck GmbH & Co., Drensteinfurt, Germany

[21] Appl. No.: 784,826

[22] Filed: Jan. 17, 1997

[30] Foreign Application Priority Data

Jan. 17, 1996 [DE] Germany ............. 196 01 491.3

[51] Int. Cl.⁶ ............. A47J 27/00; F24H 7/00; B23K 1/19
[52] U.S. Cl. ............. 99/403; 99/422; 99/447; 126/390; 126/375; 220/912; 228/262.42; 228/262.45; 228/262.61
[58] Field of Search ............. 99/403, 422, 447; 126/373, 375, 390; 220/626, 636, 453, 454, 912; 428/653, 683; 228/262.61, 262.45, 262.42

[56] References Cited

U.S. PATENT DOCUMENTS

| 3,788,513 | 1/1974 | Racz | 126/390 |
| 4,790,292 | 12/1988 | Kuhn | 126/390 |
| 5,064,055 | 11/1991 | Bessenbach et al. | 126/390 |
| 5,487,329 | 1/1996 | Fissler | 99/403 |
| 5,497,696 | 3/1996 | Coudurier et al. | 99/422 |
| 5,532,461 | 7/1996 | Crummenauer et al. | 99/422 X |

*Primary Examiner*—Reginald L. Alexander
*Attorney, Agent, or Firm*—Fay, Sharpe, Beall, Fagan, Minnich & McKee

[57] ABSTRACT

The enamelled cookware has a deep drawn shell of steel plate, placed beneath the base of which is a copper sheet. The latter is covered with a base plate comprising steel plate. The copper sheet is alloyed with the adjacent steel plates by high temperature brazing. An improvement in the cooking characteristics of the cookware is thus achieved. The latter is subsequently enamelled.

10 Claims, 1 Drawing Sheet

ENAMELLED COOKWARE AND METHOD OF MANUFACTURING IT

BACKGROUND OF THE INVENTION

1. Field of the Invention

The invention relates to a method of manufacturing enamelled cookware in which a shell with a base and side wall is deep drawn from steel plate and is enamelled both internally and externally.

2. Description of Prior Art

Such enamelled cookware can be manufactured in different sizes in the form of pots, pans, boilers and the like. It is characterised by good cooking characteristics which are due to the thermal conductivity of the steel plate.

The susceptibility to corrosion of the steel plate is eliminated by enamelling.

It is the object of the invention to further improve the cooking characteristics of the enamelled cookware.

SUMMARY OF THE INVENTION

In order to solve this object the method of the type referred to above is characterised in that after the deep drawing and before the enamelling of the shell the following steps are performed:

a copper sheet is placed externally beneath the base of the shell;

the copper sheet is covered with a base plate of metal which may be enamelled, preferably of steel plate; and the copper sheet is high temperature brazed to the base of the shell and to the base plate.

An alloy of the copper sheet with the base of the shell and with the base plate is thereby formed.

The consequence of this alloy formation is an improvement of the cooking characteristics of the enamelled cookware. These characteristics include time to boiling, energy consumption, transverse heat conduction, heat storage and burning-on characteristics. A good long term stability is also produced. It should also be emphasised that the enamelled cookware manufactured in accordance with the invention is suitable for all heating systems, that is to say for cast hot plates, glass ceramic cookers, radiant and halogen heaters and also particularly—as a result of the ferromagnetic qualities of the steel, for inductive heaters.

The thickness of the copper sheet is so selected that the desired alloy is produced in the high temperature brazing. This constitutes a continuous bond between the base of the shell and the base plate, the bond extending over the entire connection surface.

A further substantial advantage arises that cookware with any desired base thickness can be manufactured with the method in accordance with the invention. The latter may be determined by the thickness of the base plate. Since it is in fact only the thickness of the base which is altered without the thickness of the side wall being influenced thereby, the overall weight increase of the cookware itself is relatively small even with a relatively thick base plate.

The high temperature brazing is preferably performed at ca. 1100° C., advantageously under a controlled atmosphere in a continuous heating oven.

It should also be mentioned that the method in accordance with the invention does not further disrupt the normal working sequence in the manufacture of enamelled steel cookware since the high temperature brazing can be added as an additional working step into the conventional working sequence without any difficulty. The conventional steps of the enamelling process then follow, such as application of the base, application of the cover and application of decoration. Changes to this method sequence are not necessary. The same clearly applies to the deep drawing of the shell.

The invention further provides enamelled cookware with a deep drawn steel shell which has a base and a side wall and is enamelled internally and externally, this cookware being characterised in accordance with the invention that a copper sheet is positioned externally beneath the base of the shell under the enamel;

that the copper sheet is covered with a base plate of material which may be enamelled, particularly of steel plate; and that the copper sheet is high temperature brazed to the base of the shell and to the base plate, the topper of the sheet being alloyed to the base of the shell and to the base plate.

The invention will be explained in more detail below with reference to a preferred exemplary embodiment in conjunction with the attached drawings.

DESCRIPTION OF THE PREFERRED EMBODIMENT

Figure 1:
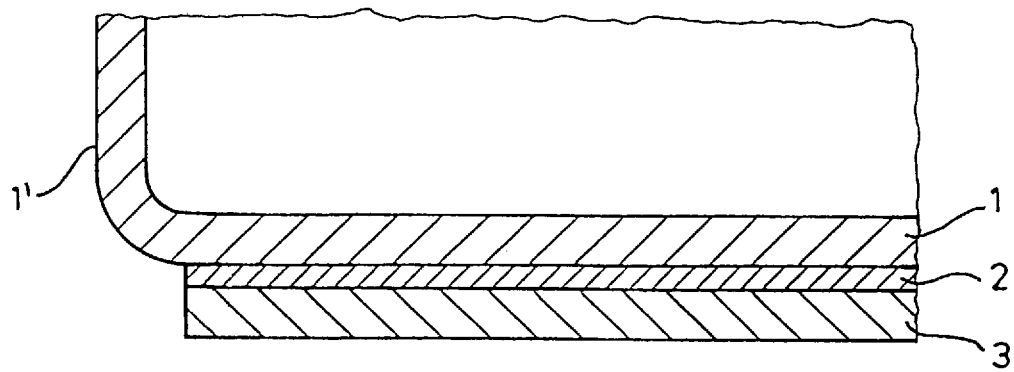
FIG. 1 a schematic sectional view through the base and sidewall of a cooking pot before the high temperature brazing.

In the manufacture of the enamelled cooking pot in accordance with the invention, a shell is deep drawn from steel plate with a base 1 and a side wall 1'. A copper sheet 2 is placed beneath the base and this is in turn covered with a base plate 3. The latter is also of steel plate. FIG. 1 shows the arrangement after carrying out the described method steps.

High temperature brazing is then effected which is performed at ca. 1100° C. in a continuous heating furnace under a controlled atmosphere in which a plurality of batches can be treated simultaneously. Alloying of the copper sheet 2 with the adjacent steel plates occurs. The continuous alloy layer is designated with the reference numeral 2' in FIG. 2. A very intimate connection of the copper with the adjacent steel plates is thus produced, whereby the cooking characteristics of the cooking pot are improved.

Figure 2:
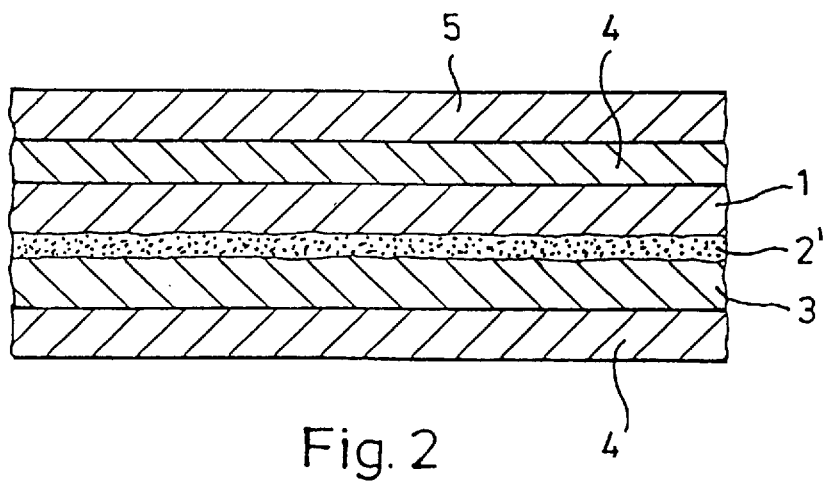
FIG. 2 a schematic sectional view through the base of the finished cooking pot.

The conventional enamelling steps are then subsequently performed, i.e. a base enamel 4 is applied and in the interior of the pot a cover enamel 5 is applied (see FIG. 2).

Modifications are of course possible within the scope of the invention. Thus the thickness of the copper sheet and above all of the base plate can be varied. Furthermore, other hard brazing methods can be used provided that the desired alloying effect is achieved. The enamelling can follow the usual process variants. Thus additional layers are possible, for instance a cover enamel on the underside of the base also. Additional decorative layers can also be applied. The shape of the cookware is of course of no consequence apart from the fact that an appropriately shaped base is necessary.

I claim:

1. An article of cookware comprising:

a deep drawn shell of low corrosion resistance steel plate which has a base and a side wall;

a base plate of material suitable for enamelling which covers the base of the shell;

a brazing alloy comprising copper located between the base plate and the base of the shell and fixedly connecting the base plate to the base of the shell; and a layer of protective enamel covering the cookware internally and externally, including the external base plate.

2. An article of cookware as claimed in claim 1 wherein the base plate comprises ferromagnetic steel plate.

3. An article of cookware comprising:

a body of low corrosion resistance ferromagnetic steel defining a base and a side wall, said body having an interior for containing material to be heated and an exterior;

a ferromagnetic steel base plate placed in at least partial covering relation with respect to the exterior base of the ferromagnetic steel body;

a thermal conductivity enhancement layer comprising a copper brazing alloy having a melting point of approximately 1100° C. located between the exterior base of the body and the ferromagnetic base plate; and, a layer of protective enamel covering at least the body exterior and base plate.

4. A method of manufacturing cookware, said method comprising:

deep drawing a shell of the cookware with a base and a side wall from steel plate of low corrosion resistance;

placing a copper plate externally beneath the base of the steel shell;

covering the copper plate with a base plate of metal suitable for enamelling;

brazing the copper plate at approximately 1100° C. to the base of the shell and to the base plate so that the copper forms an alloy with the base of the shell and with the base plate, thus intimately bonding the base plate with the base of the shell; and enamelling the cookware internally with a protective enamel; and, enamelling the cookware externally, including the base plate, with a protective enamel.

5. The method as claimed in claim 4 wherein the high temperature brazing step is performed under a controlled atmosphere in a continuous heating oven.

6. The method as claimed in claim 4 wherein a base plate of ferromagnetic steel plate is used.

7. The method as claimed in claim 4 wherein the high temperature brazing step is performed under a controlled atmosphere in a continuous heating oven.

8. An article of cookware manufactured in accordance with the method of claim 4.

9. A method of manufacturing enamelled cookware with enhanced thermal conductivity, said method comprising:

deep drawing a cookware shell from a ferromagnetic steel plate, said shell defining an interior to receive food and an exterior including a base adapted for operative placement relative to a heat source;

placing a first sheet comprising copper in at least partial covering relation with the shell base;

placing a second sheet comprising ferromagnetic steel in covering relation with the first sheet;

subjecting the shell, the first sheet, and the second sheet to a high temperature brazing operation so that the first sheet forms an alloy with both the shell and second sheet and intimately bonds the second sheet with the shell; and, covering the shell and the second sheet with a layer of enamel.

10. An article of cookware manufactured in accordance with the method of claim 9.

* * * * *